United States Patent
Chiu et al.

(10) Patent No.: US 9,971,539 B2
(45) Date of Patent: May 15, 2018

(54) HANDLING FAILURE OF A COMMAND TO ADD A RECORD TO A LOG

(71) Applicant: International Business Machines Corporation, Armonk, NY (US)

(72) Inventors: Lawrence Y. Chiu, Saratoga, CA (US); Paul H. Muench, San Jose, CA (US); Sangeetha Seshadri, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days. days.

(21) Appl. No.: 15/665,399

(22) Filed: Jul. 31, 2017

(65) Prior Publication Data
US 2017/0329551 A1    Nov. 16, 2017

Related U.S. Application Data

(63) Continuation of application No. 14/629,012, filed on Feb. 23, 2015.

(51) Int. Cl.
*G06F 3/06* (2006.01)
*G06F 11/14* (2006.01)
*G06F 11/34* (2006.01)
*G06F 17/30* (2006.01)

(52) U.S. Cl.
CPC .......... *G06F 3/0638* (2013.01); *G06F 3/0619* (2013.01); *G06F 3/0673* (2013.01); *G06F 11/1435* (2013.01); *G06F 11/1443* (2013.01); *G06F 11/3476* (2013.01); *G06F 17/30* (2013.01); *G06F 17/30144* (2013.01)

(58) Field of Classification Search
CPC .... G06F 3/0619; G06F 3/0638; G06F 3/0673; G06F 11/1435; G06F 11/1443; G06F 11/3476; G06F 17/30; G06F 17/30144
See application file for complete search history.

(56) References Cited

U.S. PATENT DOCUMENTS 8,495,036 B2    7/2013    Calder et al.
8,725,982 B2    5/2014    Tene et al.
(Continued)

OTHER PUBLICATIONS

European Search Report dated 100616, pp. 7, for Application No. 16155807.7-1954, filed Feb. 16, 2015.
(Continued)

*Primary Examiner* — Aracelis Ruiz
(74) *Attorney, Agent, or Firm* — David W. Victor; Konrad Raynes Davda & Victor LLP.

(57) ABSTRACT

Provided are a computer program product, system, and method for handling failure of a command to add a record to a log. The log has records at log addresses. A command is received to add a record to the log indicating a current log address at which the record is stored in the log. A determination is made as to whether the command has a resend parameter set, wherein the resend parameter indicates whether the command is being resent to add the record. A determination is made as to whether there is a log address in the log having the record following the current log address in response to determining that the resend parameter indicates that the command is being resent. The determined log address in the log is returned.

20 Claims, 5 Drawing Sheets

(56) References Cited

U.S. PATENT DOCUMENTS

| | | | |
|---|---|---|---|
| 8,819,382 | B2 | 8/2014 | Pizlo et al. |
| 2008/0082496 | A1 | 4/2008 | Kalos et al. |
| 2011/0218971 | A1 | 9/2011 | Cooper |
| 2013/0024460 | A1* | 1/2013 | Peterson ............... G06F 3/061 707/741 |
| 2013/0086303 | A1 | 4/2013 | Ludwig et al. |
| 2013/0275656 | A1 | 10/2013 | Talagala et al. |
| 2014/0095766 | A1 | 4/2014 | Zyulkyarov et al. |
| 2014/0310499 | A1 | 10/2014 | Sundararaman et al. |
| 2016/0246536 | A1 | 8/2016 | Chiu |
| 2016/0246830 | A1 | 8/2016 | Chiu |

OTHER PUBLICATIONS

Arpaci-Dusseau, A.C., R.H. Arpaci-Dusseau, and V. Prabhakaran, "Removing the Costs of Indirection in Flash-based SSDs with Nameless Writes", Total 5 pp.

Debnath, B., S. Sengupta, and J. Li, "SkimpyStash: RAM Space Skimpy Key-Value Store on Flash-based Storage", SIGMOD'11, Jun. 12-16, 2011, Copyright 2011 ACM, Total 12 pp.

Eklektix, Inc., "Log-structured File Systems: There's One in Every SSD [LWN.net]", [online], [Retrieved on Jan. 20, 2015]. Retrieved from the Internet at: <URL: http://lwn.net/Articles/353411/>, Copyright © 2009, Eklektix, Inc., Total 29 pp.

Koltsidas, I. and S.D. Viglas, "Data Management Over Flash Memory", Proceedings of the 2011 ACM SIGMOD International Conference on Management of data, SIGMOD'11, Jun. 12-16, 2011, Copyright 2011 ACM, Total 4 pp.

Zhang, Y., L.P. Arulraj, A.C. Arpaci-Dusseau, and R.H. Arpaci-Dusseau, "De-indirection for Flash-based SSDs with Nameless Writes", Proceedings of the 10th USENIX conference on File and Storage Technologies, 2012, Total 16 pp.

U.S. Appl. No. 14/629,012, filed Feb. 23, 2015.

Notice of Allowance dated Jun. 7, 2017, pp. 18, for U.S. Appl. No. 14/629,012, filed Feb. 23, 2015.

List of IBM Patents or Patent Applications Treated As Related dated Jul. 31, 2017, pp. 2.

* cited by examiner

Index Entry

Record

Logical to Physical Mapping Entry

Put Command

HANDLING FAILURE OF A COMMAND TO ADD A RECORD TO A LOG

BACKGROUND OF THE INVENTION

1. Field of the Invention

The present invention relates to a computer program product, system, and method for handling failure of a command to add a record to a log.

2. Description of the Related Art

In a log structured storage system, updates to data are not written in place, but written to a new logical and physical address. Data may be stored in a key-value store, where data is stored in unstructured records consisting of a key plus the values associated with that record. An index having the keys and log addresses for records in the log may be used to look up the log address in the log for the record. Each index entry has the indexed key that is unique in a namespace or set of data and an address of the data in a log.

In the log structured storage, updates are written to an end of the log, and previous versions of the record in the log remain. When an entry at a log address in the log no longer has a corresponding index entry identifying the log address, then the entry in the log is deemed unused and can be garbage collected.

SUMMARY

Provided are a computer program product, system, and method for handling failure of a command to add a record to a log. The log has records at log addresses. Each record in the log includes a key and value and the log addresses map to physical addresses in the storage. A first command for a key and value pair for a record at a specified log address in the log to add to a selected log address in the log is sent. A second command for the key and value pair for the record at the specified log address with a resend parameter set is sent in response to not receiving the selected log address. In response to receiving the second command with the resend parameter set, the log is scanned to determine if there is a determined log address after the specified log address having the key and value pair for the second command. The determined log address is returned in response to determining that the determined log address has the key and value pair for the second command.

DETAILED DESCRIPTION

If a command is sent from one system to add a record to a log maintained on another system, it is possible that the record may be added to the log, but the system sending the command does not receive acknowledgment that the record was successfully added to the log. If the sending system were just to resend the command, then if the system receiving the command successfully added the record to the log when the command was first sent and then added the same resent record to the log again for the resend command, then that same record may be located twice in the log. These duplicate log entries may result in an incorrect state after crash recovery in a system with garbage collection if the system only recognizes one of the duplicate copies of the record as the current or live version of the record. As a result if the resent record was deleted, the data may re-appear erroneously if both copies, including the initial failed attempt and the reattempted addition of the record are not deleted.

Described embodiments address the above concerns by having the system resend the command to add a record with a resend parameter indicating that the command comprises a resending of a previously sent command for which acknowledgment of completion was not received. The receiving system managing the log in response to receiving the command with the resend parameter set may then scan the log to see if there is a record having the same key and value in the resent command. The log manager may return the log address where the record is located to the sender of the command without adding the record to the log in response to the resent command to avoid adding a duplicate copy of the record to the log for the resent command.

Figure 1:
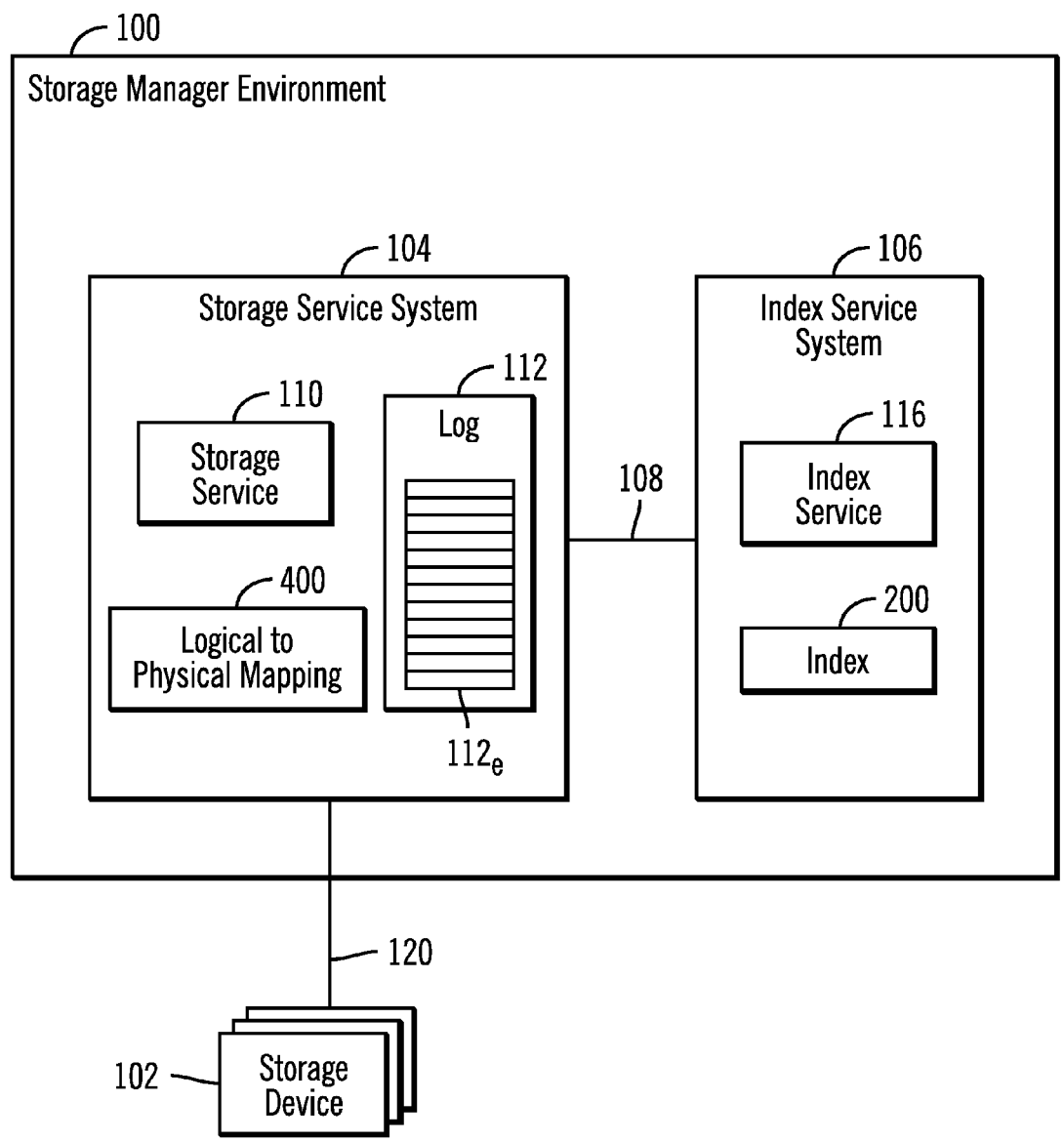
FIG. 1 illustrates an embodiment of a storage environment.

FIG. 1 illustrates a storage environment having a storage manager environment 100 managing the storage of data on one or more storage devices 102. Host systems (not shown) may communicate Input/Output (I/O) requests to the storage manager 100 to access the data in the storage devices 102. The storage manager 100 may include a storage service system 104 and an index service system 106 that communicate over a connection 108. The systems 104 and 106 may comprise different physical or virtual systems in the same or different enclosures.

The storage service system 104 includes a storage service 110 component to manage a log 112 that has records identifying data that is stored at locations in the storage devices 102. The storage service 110 maintains a logical-to-physical mapping 400 that maps log addresses of records in the log 112 to physical addresses in the storage devices 102. The index service system 106 includes an index service 116 that maintains an index 200 allowing for key-log address lookup of the records in the log 112. The index service 116 indicates the log addresses having current versions of the records having the indicated key for the log addresses. The log 112 may comprise a sequential log in which new records are added to the end of the log, i.e., the most recently used end, shown in FIG. 1 as entry $112_e$. The storage service 110 uses the index 200 to lookup records in the log 112 to determine if a record at a log address in the log 112 has a current or live version of the record. If a log address is not indicated in the index 200, than that log address would not have the current or live version of the record.

Upon receiving a request for data associated with a record having a provided key- and value, the storage service 110 can invoke the index service 116 to lookup the log addresses of the records in the index 200 having that specified key. From those log addresses returned from the index, the storage service 110 can determine from the returned log addresses, the log address record having the key and value of the requested record. From the log address in the log 112, the storage service 110 can use the logical-to-physical mapping 400 to determine the physical address in one of the storage devices 102 at which the data for the record at the log address is stored. Further, a write request from a host may be directed to the index service 116 to determine the index entry in the index 200 for the requested address to update.

The storage service system 104 may communicate with the storage devices 102 via connection 120. The connections 108 and 120 may comprise one or more networks, such as a Local Area Network (LAN), Storage Area Network (SAN), Wide Area Network (WAN), peer-to-peer network, wireless network, Internet, Intranet, etc. Alternatively, the connection 120 may comprise bus interfaces, such as a Peripheral Component Interconnect (PCI) bus or serial interface.

The storage devices 102 may comprise different types or classes of storage devices, such as a solid state storage device (SSD) comprised of solid state electronics, EEPROM (Electrically Erasable Programmable Read-Only Memory), flash memory, flash disk, Random Access Memory (RAM) drive, storage-class memory (SCM), Phase Change Memory (PCM), resistive random access memory (RRAM), spin transfer torque memory (STM-RAM), conductive bridging RAM (CBRAM), magnetic hard disk drive, optical disk, tape, etc. The storage devices 102 may further be configured into an array of devices, such as Just a Bunch of Disks (JBOD), Direct Access Storage Device (DASD), Redundant Array of Independent Disks (RAID) array, virtualization device, etc. Further, the storage devices 102 may comprise heterogeneous storage devices from different vendors or from the same vendor.

FIG. 1 shows the storage service 110 and index service 116 as components in separate system 104 and 106 that may have different operating systems. Alternatively, the storage service 110 and index service 116 may be in a same system managed by a same operating system. The storage service 110 and index service 116 may execute in the operating system kernel space or in a user space.

Figure 2:
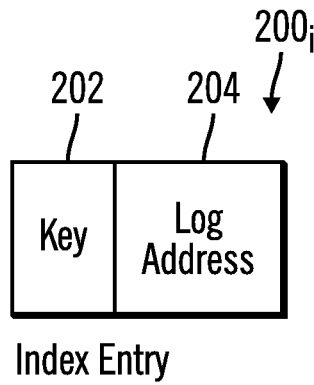
FIG. 2 illustrates an embodiment of an index entry.

FIG. 2 illustrates an embodiment of an instance of an index entry $200_i$ in the index 200, and includes a key 202 and log address 204 pair, where the log address 204 identifies a location in the log 112 of the record identified by the index entry $200_i$. Although there may be multiple versions of a record, i.e., unique key-value pair, in the log 112, the index 200 would only include one index entry $200_i$ for a key and log address to provide the log addresses that have current versions of a record. Other records for the key-value pair in the log 112 whose log address is not included in the index 200 comprise non-active or previous versions of the record that map to physical addresses in the storage device 102 that do not have the most current version of the data identified by the record.

Figure 3:
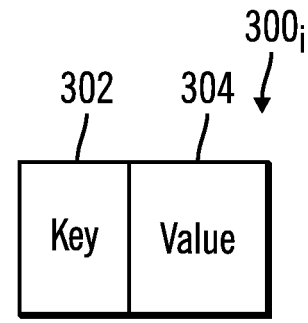
FIG. 3 illustrates an embodiment of a record in the log storage.

FIG. 3 illustrates an embodiment of an instance of a record $300_i$ included in the log 112, and includes a key 302 and value 304 pair. The record $300_i$ may include a pointer to a previous version of the record in the log 112, if any. In the case of a PUT command that was not recorded due to a failure, the back-chain would skip over the unrecorded record. The log 112 may store records in sequential order, so a new record is added to the end of the log, such as entry $112_e$ shown in FIG. 1. The record $300_i$ may further indicate the key size and value size.

Figure 4:
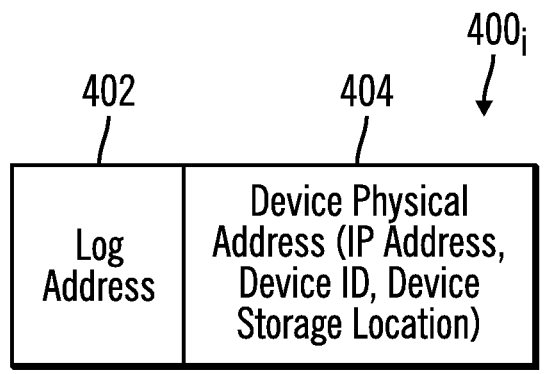
FIG. 4 illustrates an embodiment of a logical-to-physical mapping.

FIG. 4 illustrates an embodiment of an entry $400_i$ in the logical-to-physical mapping 400, including a log address 402 and a corresponding device physical address 404 in one of the storage devices 102. The device physical address 404 may include a network address (e.g., Internet Protocol address, MAC address), unique device ID, and a physical location in the storage device 102. In this way, the mapping 400 maps the log 112 addresses or entries in the log 112 to physical address across multiple storage devices 102, or in a single storage device 102 as the case may be. For example, if there are two storage devices, the log 112 may comprise an abstraction that provides for storing data in sequential addresses in a first storage devices followed by storing data in addresses in a second storage device. In alternative embodiments, the logical to physical mapping 400 may provide a mapping of sequential log addresses to alternate between the storage devices to interleave storing data in different of the storage devices according to a pre-defined sequence implemented in the logical to physical mapping 400.

Figure 5:
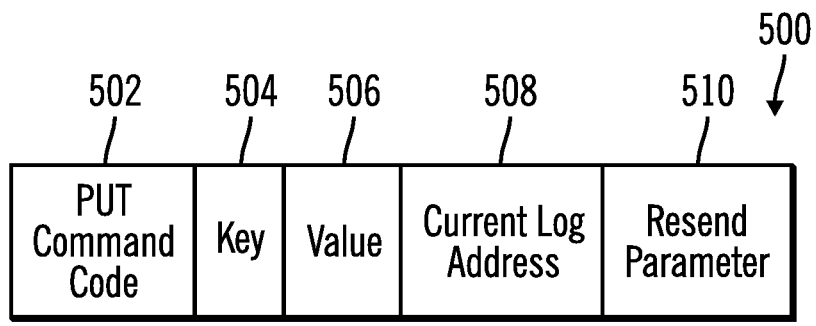
FIG. 5 illustrates an embodiment of a PUT command.

FIG. 5 illustrates an embodiment of a PUT command 500 used by the index service 108 to add a new record to the end of the log $112_e$, or whatever location is the most recently used end of the log 112. The PUT command 500 includes a PUT command code 502, a key 504, a key value 506, a log address 506 of the record being updated by the key 504 and value 506, and a resend parameter 510 indicating whether this PUT command is resending a previously sent PUT command 500 with the same key 504, value 506, and specified log address 506. The PUT command 500 is resent if no response was received for a previously sent PUT command 500.

The PUT command 500 causes the storage service 106 to add a record having the key 504 and value 506 to the most recently used end of the log $112_e$. The storage service 110 may return the log address of the location in the log $112_e$ to which the record for the log address 506 was added. The log address 112e is incremented to point to a next log address after using the log address $112_e$.

In the embodiment of FIG. 5, the key 504 and value 506 to include in a new record to replace the record $300_i$ at the specified log address 506 may be included in the PUT command itself 500. In alternative embodiments, the key 504 and value 506 may not be included in the command 500 but accessed from another location to add to the log 112 at the log address $112_e$. In this way, the record added to the log address $112_e$ replaces the specified log address 506, thus making the specified log address a non-current or older version of the record.

The index service 116 may receive a key and new value from a host for an address in the log, and then use the PUT command 500 to add that key and new value to the log. Further, the index service 116 may use the PUT command to move a record from a current log address in the log 112 to the MRU end $112_e$ for purposes other than updating data, such as to reclaim log addresses for garbage collection.

When a record is added to the log 112, such as at log address $112_e$, the data for the record may be copied to the location in the storage 102 mapping to the recently used log address $112_e$ according to the logical to physical mapping entry $400_i$ for the used log address $112_e$. Further, the index service 106 updates the index entry $200_i$ for the specified log 506 address to indicate the new log address $112_e$ to which the record was added, so that the index indicates the log address in the log 112 having the current version for the record.

Figure 6:
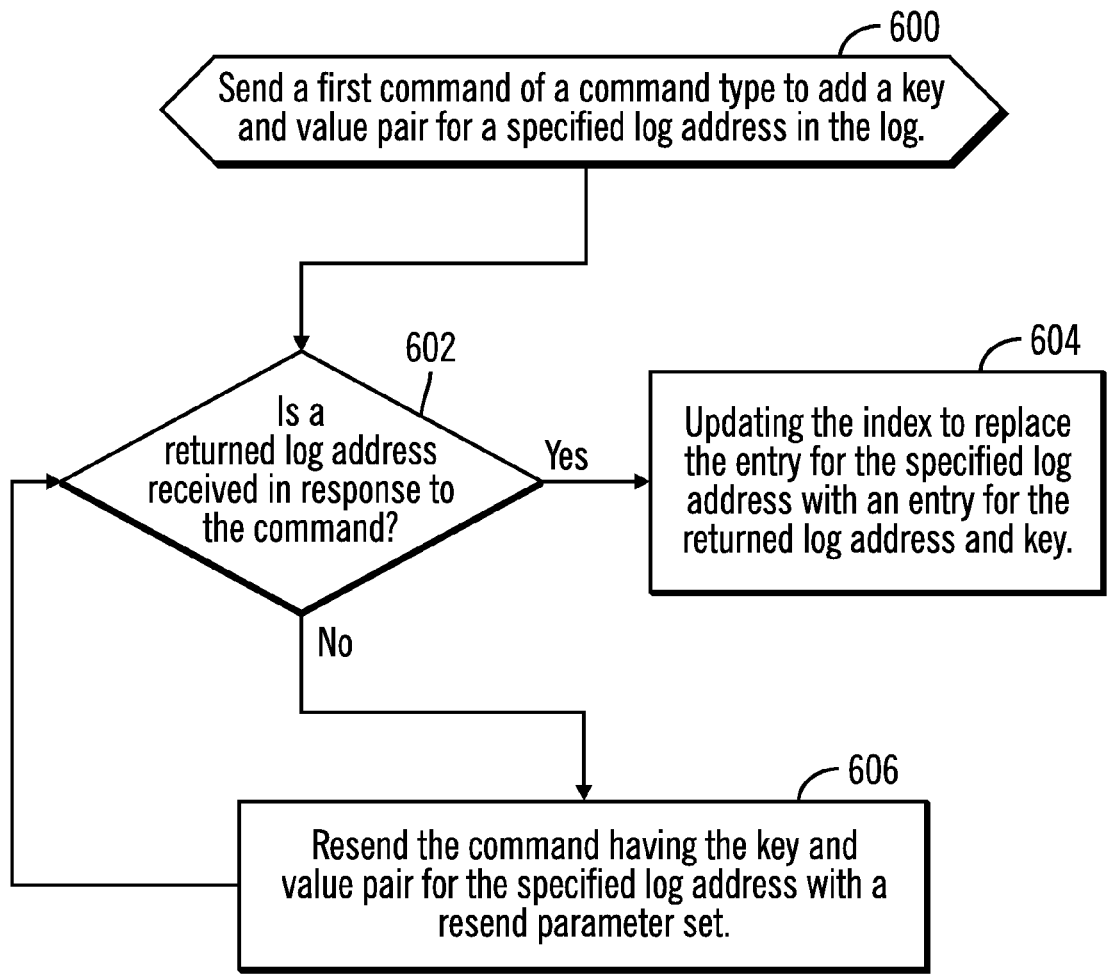
FIG. 6 illustrates an embodiment of operations to send a command to add a record to a log.

FIG. 6 illustrates an embodiment of operations performed by the storage manager 100 components, such as the index service 116, to send a command, such as a PUT command 500, to add a record to the log 112. Control begins (at block 600) with the index service 116 sending a first command of a command type, e.g., the PUT command 500, to add a key and value pair for a specified log address in the log. If (at block 602) a returned log address to which the record was written is received in response to the command, then the index service 116 updates (at block 604) the index 200 to replace the entry $200_i$ for the specified log address 506 with an entry 200 for the returned log address and key. The entry for the specified log address 506 may be replaced by updating the current index entry $200_i$ for the specified log address 506 to indicate the returned log address or to delete or invalidate the entry for the specified log address 506 and add a new index entry 200 for the returned log address. If (at block 602) no response is received to the sent command, such as after a timeout period, then the index service 116 resends (at block 606) a further command of the command type having the previously sent key 504, value 506, and current log address 508 with the resend parameter 510 set to indicate this is a resent command 500. The index service 116 may resend the command 500 multiple times or a limited number of times if a response is not received within a timeout period.

Figure 7:
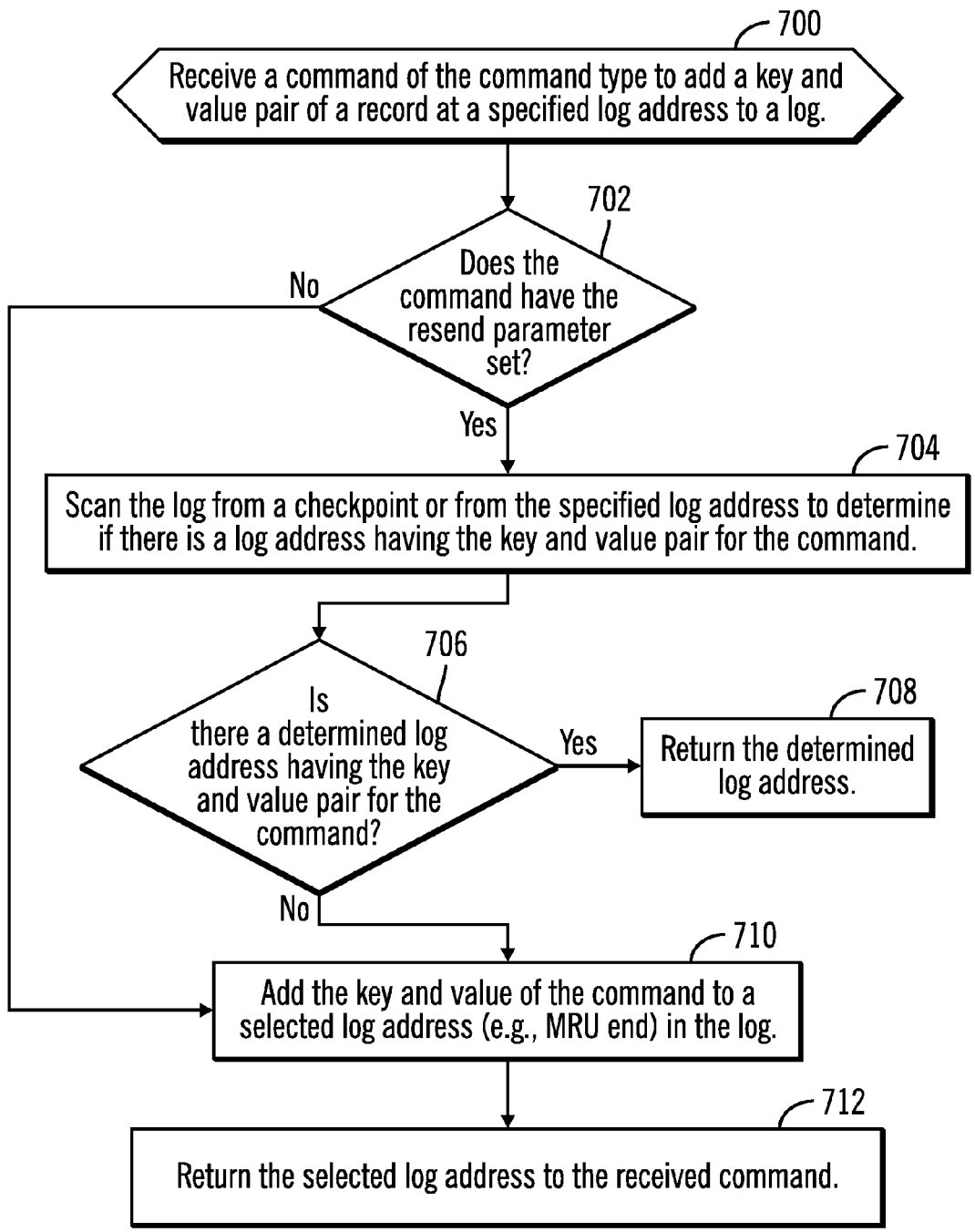
FIG. 7 illustrates an embodiment of operations to process a command to add a record to the log.

FIG. 7 illustrates an embodiment of operations performed by the storage manager 100, such as the storage service 110, to process the commands 500 sent from the index service 116 or other component. Upon receiving (at block 700) the command 500, the storage service 110 determines (at block 702) whether the command has the resend parameter 510 set. If so, then this is a resending of the command 500, and the storage service 110 scans (at block 704) the log 112 from the specified log address 506 or from a checkpoint indicating a point up to which log addresses have been validated. The log 112 is scanned to determine if there is a log address having the resent key 504 and value 506 pair indicated in the command 500. If (at block 706) there is a determined log address already having the resent key 504 and value 506 pair in this resent command, then this record would have been previously added to the log in response to the previously sent command 500, but for some reason the index service 116 did not receive acknowledgment from the storage service 110 that the command 500 was completed. The reasons for lack of acknowledgment can be due to network communication failure, a bug, or some other computational error. If (at block 706) the scan does not result in locating a determined log address having the resent key 504 and value 506, then the storage service 110 may have failed to execute or complete processing a previously sent command 500.

If (at block 706) the resent key 504 and value 506 pair already exist in the log 112 then the determined log address is returned (at block 708) to the sender of the command, because the resent key 504 and value 506 pair were previously added to the log 112. Otherwise, if scanning the log 112 did not locate the previously sent key 504 and value 506 or if (from the no branch of block 702) the resend parameter 508 is not set, then the storage service 110 adds (at block 710) the resent key 504 and value 506 pair to a record at a selected log address in the log 112, such as at the MRU end $112_e$ of the log 112. The selected log address is returned (at block 712) to the received command.

In the described embodiments of FIGS. 6 and 7, the operations are performed by the storage service 110 and index service 116 located on separate systems 104 and 106, respectively, where there may be a communication failure between the systems that prevents the storage service 110 from returning the selected log address to which the record is added to the index service 116. In an alternative embodiment, these operations may be performed by different components on the same or different systems. Further, in the embodiments of FIGS. 6 and 7, the command 500 comprises a PUT command 500. In alternative embodiments, the command processing may be performed for command types other than a PUT command.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 8:
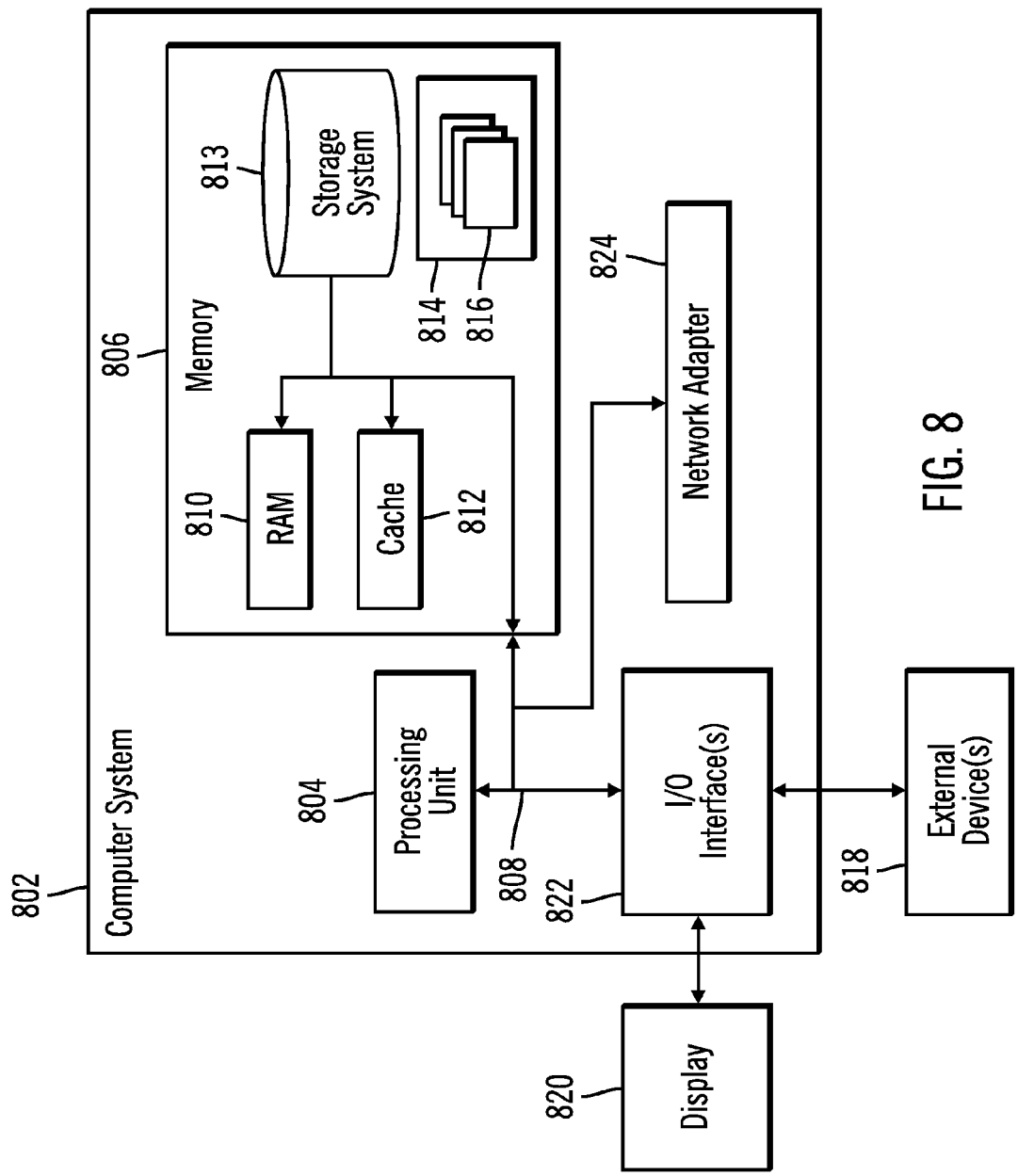
FIG. 8 illustrates a computing environment in which the components of FIG. 1 may be implemented.

The storage manager 100 components such as the systems 104 and 106 of FIG. 1 may be implemented in one or more computer systems, such as the computer system 802 shown in FIG. 8. Computer system/server 802 may be described in the general context of computer system executable instructions, such as program modules, being executed by a computer system. Generally, program modules may include routines, programs, objects, components, logic, data structures, and so on that perform particular resources or implement particular abstract data types. Computer system/server 802 may be practiced in distributed cloud computing environments where resources are performed by remote processing devices that are linked through a communications network. In a distributed cloud computing environment, program modules may be located in both local and remote computer system storage media including memory storage devices.

As shown in FIG. 8, the computer system/server 802 is shown in the form of a general-purpose computing device. The components of computer system/server 802 may include, but are not limited to, one or more processors or processing units 804, a system memory 806, and a bus 808 that couples various system components including system memory 806 to processor 804. Bus 808 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media.

System memory 806 can include computer system readable media in the form of volatile memory, such as random access memory (RAM) 810 and/or cache memory 812. Computer system/server 802 may further include other removable/non-removable, volatile/non-volatile computer system storage media. By way of example only, storage system 813 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 808 by one or more data media interfaces. As will be further depicted and described below, memory 806 may include at least one program product having a set (e.g., at least one) of program modules that are configured to carry out the functions of embodiments of the invention.

Program/utility 814, having a set (at least one) of program modules 816, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. The components of the computer 2 may be implemented as program modules 816 which generally carry out the functions and/or methodologies of embodiments of the invention as described herein.

Computer system/server 802 may also communicate with one or more external devices 818 such as a keyboard, a pointing device, a display 820, etc.; one or more devices that enable a user to interact with computer system/server 12; and/or any devices (e.g., network card, modem, etc.) that enable computer system/server 802 to communicate with one or more other computing devices. Such communication can occur via Input/output (I/O) interfaces 822. Still yet, computer system/server 802 can communicate with one or more networks such as a local area network (LAN), a general wide area network (WAN), and/or a public network (e.g., the Internet) via network adapter 824. As depicted, network adapter 824 communicates with the other components of computer system/server 802 via bus 808. It should be understood that although not shown, other hardware and/or software components could be used in conjunction with computer system/server 802. Examples, include, but are not limited to: microcode, device drivers, redundant processing units, external disk drive arrays, RAID systems, tape drives, and data archival storage systems, etc.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinel after appended.

What is claimed is:

1. A computer program product for managing data in a storage, the computer program product comprising a computer readable storage medium having computer readable program code embodied therein that executes to perform operations, the operations comprising:
   providing a log having records at log addresses;
   receiving a command to add a record to the log indicating a current log address at which the record is stored in the log;
   determining whether the command has a resend parameter set, wherein the resend parameter indicates whether the command is being resent to add the record after a previous command was sent to add the record to the log with the current log address;
   determining a log address in the log having the record following the current log address in response to determining that the resend parameter indicates that the command is being resent; and
   returning the determined log address in the log.

2. The computer program product of claim 1, wherein the operations further comprise:
   adding the record to the log in response to determining that the resend parameter does not indicate that the command is being resent.

3. The computer program product of claim 1, wherein the operations further comprise:
   adding the record to the log in response to determining that there is no log address in the log following the current log address having the record.

4. The computer program product of claim 1, wherein the records in the log have a key and value pair, wherein the determining a log address in the log having the record comprises determining a record at a log address in the log following the current log address having the key and value pair in the record to add.

5. The computer program product of claim 1, wherein the log stores records in a sequential order, where a new record is added to a most recently used end of the log.

6. The computer program product of claim 1, wherein the determining a log address in the log having the record following the current log address comprises scanning log addresses following a checkpoint log address in the log, wherein log addresses up to the checkpoint log address have been validated.

7. The computer program product of claim 1, wherein the operations further comprise:
   providing a storage service on a first system to manage the log, wherein the storage service performs the operations of providing the log, receiving the command to add the record, determining whether the command has the resend parameter set, determining the log address in the log, and returning the determined log address; and
   providing an index service on a second system in communication with the first system to manage an index to records in the log, wherein each index entry in the index identifies a log address in the log of one of the records;
   wherein the index service performs:
      sending the command to the storage service to add the record to the log indicating the current log address; and
      resending the command to add the record to the log indicating the current log address with the resend parameter set to indicate that the command is being resent in response to not receiving a log address from the storage service in response to the command.

8. A system for managing data in a storage, comprising:
   a processor; and
   a computer readable storage medium having computer readable program code embodied therein that when executed performs operations, the operations comprising:
      providing a log having records at log addresses;
      receiving a command to add a record to the log indicating a current log address at which the record is stored in the log;
      determining whether the command has a resend parameter set, wherein the resend parameter indicates whether the command is being resent to add the record after a previous command was sent to add the record to the log with the current log address;
      determining a log address in the log having the record following the current log address in response to determining that the resend parameter indicates that the command is being resent; and
      returning the determined log address in the log.

9. The system of claim 8, wherein the operations further comprise:
   adding the record to the log in response to determining that the resend parameter does not indicate that the command is being resent.

10. The system of claim 8, wherein the operations further comprise:
   adding the record to the log in response to determining that there is no log address in the log following the current log address having the record.

11. The system of claim 8, wherein the records in the log have a key and value pair, wherein the determining a log address in the log having the record comprises determining whether a log address in the log following the current log address having the key and value pair in the record to add.

12. The system of claim 8, wherein the log stores records in a sequential order, where a new record is added to a most recently used end of the log.

13. The system of claim 8, wherein the determining a log address in the log having the record following the current log address comprises scanning log addresses following a checkpoint log address in the log, wherein log addresses up to the checkpoint log address have been validated.

14. The system of claim 13, further comprising:
a first system including a storage service to manage the log, wherein the storage service performs the providing the log, receiving the command to add the record, determining whether the command has the resend parameter set, determining the log address in the log, and returning the determined log address; and
a second system including an index service on a second system in communication with the first system to manage an index to records in the log, wherein each index entry in the index identifies a log address in the log of one of the records;
wherein the index service performs:
sending the command to the storage service to add the record to the log indicating the current log address; and
resending the command to add the record to the log indicating the current log address with the resend parameter set to indicate that the command is being resent in response to not receiving a log address from the storage service in response to the command.

15. A method for managing data in a storage, comprising:
providing a log having records at log addresses;
receiving a command to add a record to the log indicating a current log address at which the record is stored in the log;
determining whether the command has a resend parameter set, wherein the resend parameter indicates whether the command is being resent to add the record after a previous command was sent to add the record to the log with the current log address;
determining a log address in the log having the record following the current log address in response to determining that the resend parameter indicates that the command is being resent; and
returning the determined log address in the log.

16. The method of claim 15, further comprising:
adding the record to the log in response to determining that the resend parameter does not indicate that the command is being resent.

17. The method of claim 15, further comprising:
adding the record to the log in response to determining that there is no log address in the log following the current log address having the record.

18. The method of claim 15, wherein the records in the log have a key and value pair, wherein the determining a log address in the log having the record comprises determining a log address in the log following the current log address having the key and value pair in the record to add.

19. The method of claim 15, wherein the log stores records in a sequential order, where a new record is added to a most recently used end of the log.

20. The method of claim 15, wherein the determining whether there is a log address in the log having the record following the current log address comprises scanning log addresses following a checkpoint log address in the log, wherein log addresses up to the checkpoint log address have been validated.

* * * * *